US008342839B2

(12) United States Patent
Rindom

(10) Patent No.: US 8,342,839 B2
(45) Date of Patent: Jan. 1, 2013

(54) ASSEMBLY FOR HANGING A CANDLE INSIDE A BOTTLE

(76) Inventor: Roy Rindom, Hollywood, FL (US)

( * ) Notice: Subject to any disclaimer, the term of this patent is extended or adjusted under 35 U.S.C. 154(b) by 0 days.

(21) Appl. No.: 12/871,977

(22) Filed: Aug. 31, 2010

(65) Prior Publication Data

US 2011/0053104 A1   Mar. 3, 2011

Related U.S. Application Data

(60) Provisional application No. 61/238,721, filed on Sep. 1, 2009.

(51) Int. Cl.
*F21L 19/00* (2006.01)
*F21V 1/00* (2006.01)
*F21V 3/00* (2006.01)
*F21L 26/00* (2006.01)

(52) U.S. Cl. ........ 431/289; 431/288; 431/291; 431/296; 431/297; 431/310; 248/217.1; 248/685; 248/690; 248/693; D26/9; D26/72; D26/88

(58) Field of Classification Search ............ 431/289, 431/288, 290, 296, 297, 310; 248/217.2, 248/685, 690, 693, 217.1; D26/9, 72, 88; F21L 19/00, 26/00, 23/00; F21S 13/04; F21V 1/00, F21V 3/00
See application file for complete search history.

(56) References Cited

U.S. PATENT DOCUMENTS

| 1,332,214 A * | 3/1920 | Harris | 362/437 |
|---|---|---|---|
| 2,189,746 A * | 2/1940 | Candy, Jr. | 362/161 |
| 2,214,991 A * | 9/1940 | Candy, Jr. | 362/161 |
| 2,584,223 A * | 2/1952 | Petelinsek | 116/150 |
| 2,795,209 A * | 6/1957 | Lewis | 119/63 |
| 3,170,538 A * | 2/1965 | Detrick | 181/141 |
| 3,202,815 A * | 8/1965 | Moore | 362/294 |
| 3,327,108 A * | 6/1967 | Press | 362/161 |
| D225,563 S * | 12/1972 | Mackey | D26/88 |
| 3,740,547 A * | 6/1973 | Contratto et al. | 362/449 |
| 3,820,273 A * | 6/1974 | Novak | 3/113 |
| 4,025,289 A * | 5/1977 | Duncan et al. | 102/358 |
| 4,184,195 A * | 1/1980 | Duncan | 362/163 |
| D278,008 S * | 3/1985 | Chan et al. | D6/514 |
| 4,566,055 A * | 1/1986 | Klees et al. | 362/162 |
| D321,261 S * | 10/1991 | Shiraishi | D26/11 |
| 5,361,192 A * | 11/1994 | Lai | 362/123 |
| 5,657,953 A * | 8/1997 | Smith | 248/217.1 |
| 5,803,587 A * | 9/1998 | Chen | 362/161 |
| D442,302 S * | 5/2001 | Hsu | D26/9 |
| D443,369 S * | 6/2001 | Hsu | D26/9 |
| D444,589 S * | 7/2001 | Hsu | D26/87 |
| 6,685,337 B2 * | 2/2004 | Klees | 362/228 |
| D521,177 S * | 5/2006 | Orozco | D26/87 |
| 7,523,910 B2 * | 4/2009 | Moran | 248/317 |
| D645,174 S * | 9/2011 | Johnson | D26/9 |
| 2007/0284498 A1* | 12/2007 | Moran | 248/317 |
| 2010/0027280 A1* | 2/2010 | Chiu | 362/433 |
| 2010/0313767 A1* | 12/2010 | Kramer | 99/323 |

FOREIGN PATENT DOCUMENTS

DE   10252488 A1 *  5/2004
WO   WO 2004055428 A1 *  7/2004

* cited by examiner

*Primary Examiner* — Steven B McAllister
*Assistant Examiner* — Daniel E Namay
(74) *Attorney, Agent, or Firm* — Robert M. Schwartz

(57) ABSTRACT

An assembly is provided whereby a candle holder is supported within a bottle and the bottle has no bottom and a single assembly supports both the candle holder and bottle.

6 Claims, 1 Drawing Sheet

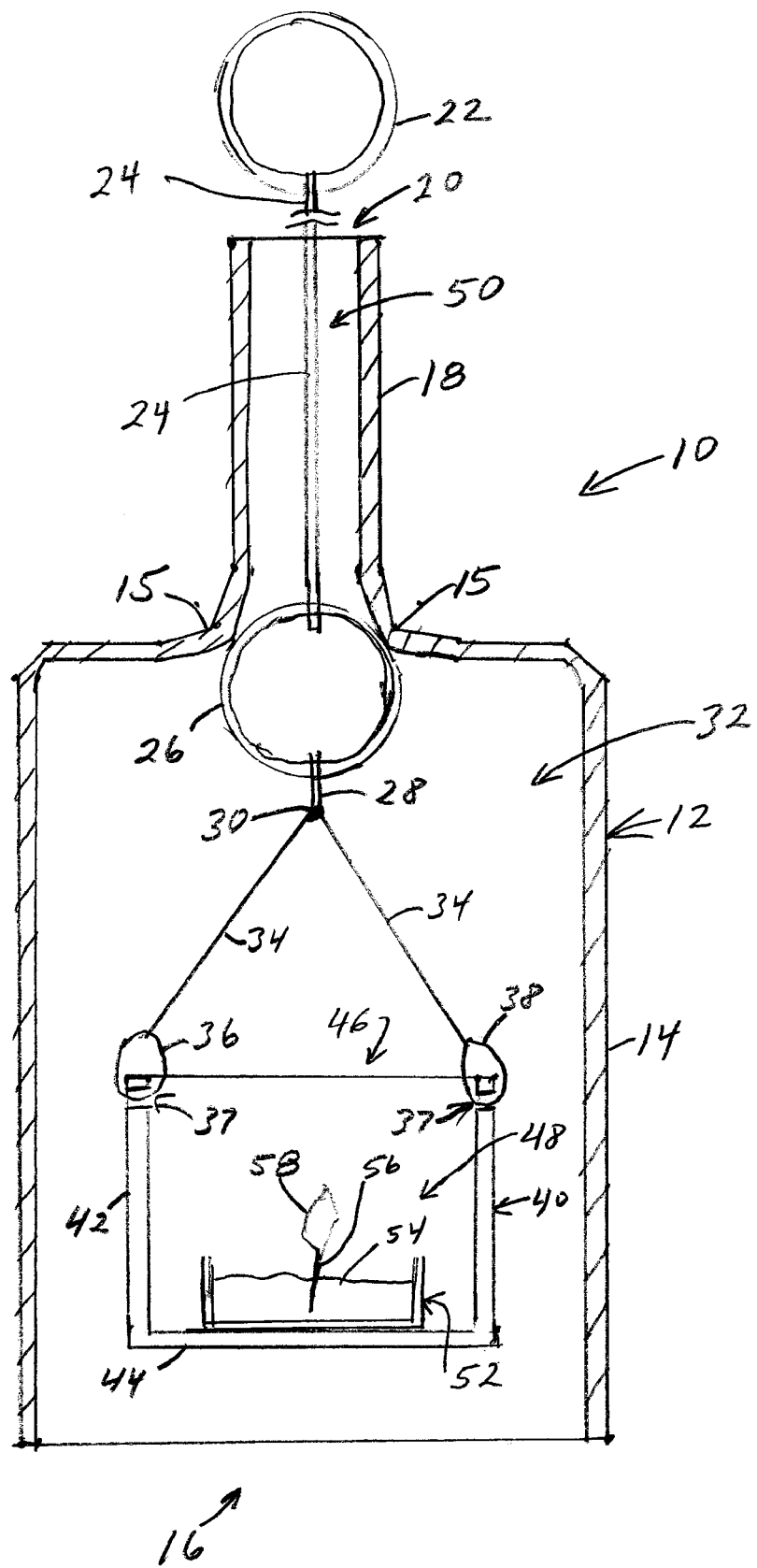

ASSEMBLY FOR HANGING A CANDLE INSIDE A BOTTLE

INDEX TO RELATED APPLICATIONS

This application claims benefit of U.S. Provisional Application No. 61,238,721, filed Sep. 1, 2009, the disclosure of which is incorporated herein by reference in its entirety.

BRIEF DESCRIPTION OF THE DRAWINGS

FIG. 1 is a side view in cross section of the disclosed assembly.

DETAILED DESCRIPTION OF THE PREFERRED EMBODIMENT

Assembly 10 includes a bottle 12. Bottle 12 has a main body circumferential wall 14 that defines main bottle cavity 32. Main bottle cavity 32 is open on its bottom end at lower bottle opening 16. Wall 14 is clear to translucent. Bottle 12 in the preferred embodiment is a wine bottle where the bottom has been sawed off, or removed as is known in the art.

Bottle 12 further has incorporated thereon, bottleneck 18 that is open on its upper portion at upper bottle opening 20. Upper ring 22 is above bottle neck 18 and has upper wire 24 connected thereto.

Upper wire 24 extends through bottleneck cavity 50 and connects to lower ring 26 positioned in main bottle cavity 32. Lower ring 26 has lower wire 28 connected thereon.

Lower wire 28 is connected to candle support wire 34 at upper candle support connector 30. Candle support wire 34 is a single wire that has separate substantially equal lengths divided at candle support connector 30. Candle support wire 34 is connected to candle jar holder 40 at first candle holder support connector 36 and second candle holder support connector 38. Candle jar holder 40 includes an opening 37, (a drilled hole) to receive connector 36.

Candle jar holder 40 has a floor 44 and a circumferal wall 42 that defines a candle holder cavity 48 that is accessed at candle holder opening 46. Candle jar holder 40 is constructed and arranged to hold candle 52 on floor 44 within candle holder cavity 48.

In use, ring 22 is lowered onto bottleneck 18. The diameter of ring 22 is larger than the inner diameter of bottleneck 18, to prevent ring 22 from entering cavity 50 of bottleneck 18. Upper wire 24 has a length longer than the length of bottleneck 18 such that when ring 22 is positioned on top of bottleneck 18, excess length of upper wire 24 extends downward into bottle cavity 32. The excess length of upper wire 24 extending downward into bottle cavity 32 gravitationally allows the lowering of lower ring 26 into bottle cavity 32. Lower ring 26 has connected thereon lower wire 28. The lowering of ring 26 subsequently lowers candle jar holder 40. Candle jar holder 40 exits main bottle cavity 32 at lower opening 16 in order to insert a new candle 52 into holder 40 or to remove a previously used candle 52 from holder 40.

A Candle 52, as is known, has candle wax 54, a wick 56 extending upward from candle wax 54, and a flame 58 when lighted, on said wick 56. In the preferred embodiment, candle 52 is a tea candle 52, which is placed within interior cavity 48 of candle jar holder 40. Tea Candle 52 is lighted and candle holder 52 is placed near lower bottle opening 16. Upper ring 22 is moved upward from bottle 12 and results in candle holder 40 being moved into main bottle cavity 32. Lower ring 26 has a diameter greater than the inner diameter of bottleneck 18 such that when upper ring 22 is moved away from bottle 12, lower ring 26 does not enter interior bottle neck cavity 50 within bottleneck 18, and ring 26 supports bottle 12 at shoulder 15. Ring 22 preferably is placed at a desirable location where assembly 10 is to be supported.

Upper ring 22, when extended, is used to hang assembly 10 in a desired location. Hanging assembly 10 by upper ring 22 is secure because lower ring 26 in contact with interior of bottleneck 18 supports each of candle holder 40 and bottle 12.

Upper ring 22, upper wire 24, lower ring 26, lower wire 28, candle holder support 34, candle holder 40, first candle holder support connector 36, and second candle holder support connector 38, are collectively referred to as hanging assembly.

Thus, the assembly is hung and displayed using a single hanging assembly that supports each of candle holder 40 and bottle 12.

When assembly 10 is hung from ring 22, when bottle 12 moves to and fro, e.g., by wind, holder 40 contacts inner wall 14 and causes a chime sound.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. An assembly for hanging a candle comprising:
    a bottle having a walled main bottle cavity, a bottleneck opening, a bottleneck diameter and length, a bottleneck cavity and an open bottom;
    a hanging assembly including:
        a candle holder;
        two rings affixed to one another by a wire, said rings dimensioned for being larger than said bottleneck diameter, said wire having a length greater than the length of said bottleneck for extending through said bottleneck cavity, a first one of said rings is outside said bottleneck opening and a second one of said rings is inside said bottle and
        supports between said candle holder and said second one of said rings, for supporting said candle holder within said main bottle cavity.

2. The assembly of claim 1 wherein said supports include a candle support wire connected at one end to one side of said candle holder extending to the opposite said of said candle holder and said candle support wire is suspended at its midportion connected to said second one of said rings.

3. The assembly of claim 2 wherein said second one of said rings supports said bottle at the shoulder of said bottle.

4. The assembly of claim 3 wherein said candle holder swings freely from said second one of said ring supports within said main bottle cavity.

5. The assembly of claim 4 wherein said candle holder has a round circumferential wall and a floor to support a candle.

6. The assembly of claim 5 wherein said candle holder has opposed openings in said circumferential wall to receive said candle support wire.

* * * * *